United States Patent
Jin et al.

(10) Patent No.: US 10,469,128 B1
(45) Date of Patent: Nov. 5, 2019

(54) ANALOG ECHO CANCELLATION WITH DIGITAL-TO-ANALOG CONVERTER NOISE SUPPRESSION

(71) Applicant: Cisco Technology, Inc., San Jose, CA (US)

(72) Inventors: Hang Jin, Plano, TX (US); John T. Chapman, Coto de Caza, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/957,079

(22) Filed: Apr. 19, 2018

(51) Int. Cl.
- *H03H 7/30* (2006.01)
- *H03H 7/40* (2006.01)
- *H03K 5/159* (2006.01)
- *H04B 3/23* (2006.01)

(52) U.S. Cl.
CPC .................. *H04B 3/238* (2013.01)

(58) Field of Classification Search
CPC . H04B 3/238; H04L 25/0307; H04M 3/42068
USPC ................. 375/230, 231, 232, 350
See application file for complete search history.

(56) References Cited

U.S. PATENT DOCUMENTS

| | | | | | |
|---|---|---|---|---|---|
| 5,896,452 A | * | 4/1999 | Yip | ........ | H04B 3/238 379/398 |
| 6,810,076 B1 | * | 10/2004 | Tang | ........ | H04B 3/238 367/135 |
| 7,848,405 B2 | * | 12/2010 | Higure | ........ | H04L 25/0307 375/230 |
| 2017/0353608 A1 | * | 12/2017 | Li | ........ | H04M 3/42068 |

* cited by examiner

*Primary Examiner* — Phuong Phu
(74) *Attorney, Agent, or Firm* — Merchant & Gould P.C.

(57) ABSTRACT

Analog echo cancellation with Digital-to-Analog Converter (DAC) noise suppression may be provided. First, a test signal may be sent through an echo cancellation pathway during a downstream silence period and an upstream silence period. The echo cancellation pathway may comprise an electronic element. Next, a loopback response signal may be received in response to sending the test signal through the echo cancellation pathway. Then a channel response model may be created that characterizes a channel response of the loopback response signal and a non-linear model may be created that characterizes a non-linearity of the electronic element. Next, for a downstream signal, a non-linear component may be generated based on the created non-linear model. The generated non-linear component may be convolved with the created channel response model. The convolved non-linear component may then be subtracted from an upstream signal.

17 Claims, 3 Drawing Sheets

ANALOG ECHO CANCELLATION WITH DIGITAL-TO-ANALOG CONVERTER NOISE SUPPRESSION

TECHNICAL FIELD

The present disclosure relates generally to echo cancellation.

BACKGROUND

A Hybrid Fiber-Coaxial (HFC) network is a broadband network that combines optical fiber and coaxial cable. It has been commonly employed globally by cable television operators. In a HFC cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
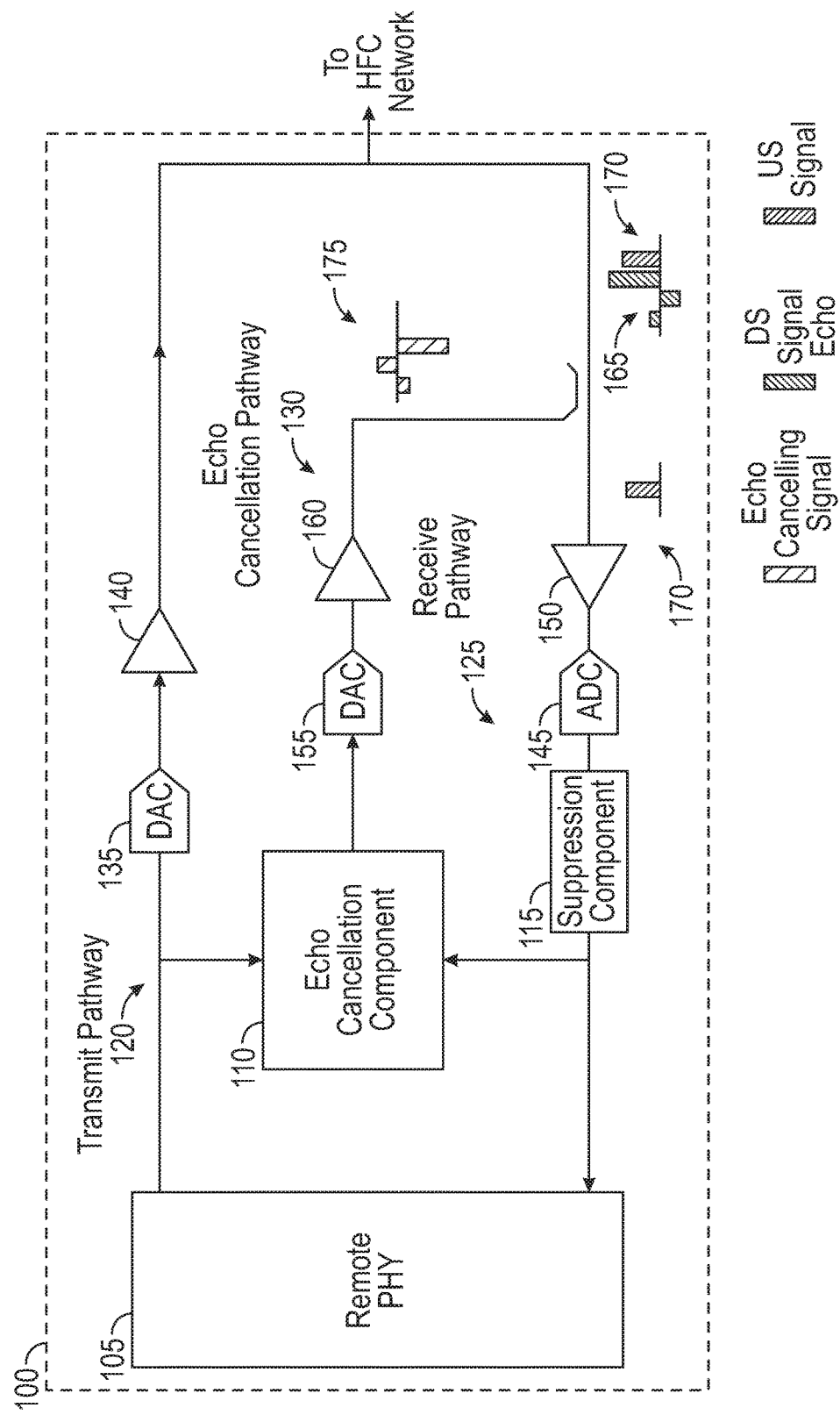
FIG. 1 is a block diagram of a system for providing noise suppression.

Analog echo cancellation with Digital-to-Analog Converter (DAC) noise suppression may be provided. First, a test signal may be sent through an echo cancellation pathway during a downstream silence period and an upstream silence period. The echo cancellation pathway may comprise an electronic element. Next, a loopback response signal may be received in response to sending the test signal through the echo cancellation pathway. Then a channel response model may be created that characterizes a channel response of the loopback response signal and a non-linear model may be created that characterizes a non-linearity of the electronic element. Next, for a downstream signal, a non-linear component may be generated based on the created non-linear model. The generated non-linear component may be convolved with the created channel response model. The convolved non-linear component may then be subtracted from an upstream signal.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. These systems may include HFC networks. To amplify upstream (US) signals and downstream (DS) signals in the HFC network, MSOs may use nodes deployed within the HFC. In the HFC network, a node may comprise a container that may house optical and electrical circuitry. An optical fiber cable or a coaxial cable may be connected to an US side of the node and a plurality of coaxial cables may be connected to a DS side of the node. The US side of the node may be connect to a headend in the HFC network and the DS side of the node may be connected to Customer Premises Equipment (CPE) of subscribers to the HFC. Amplifiers may be used in the node to amplify upstream (US) signals and downstream (DS) signals. Embodiments of the disclosure may provide an analog echo cancellation process that may include Digital-to-Analog Converter (DAC) noise suppression for supporting full duplex (FDX) Data Over Cable Service Interface Specification (DOCSIS) operation.

FIG. 1 is a block diagram of a system 100 for providing analog echo cancellation with Digital-to-Analog Converter (DAC) noise suppression consistent with embodiments of the disclosure. As shown in FIG. 1, system 100 may comprise a remote PHY 105, an echo cancellation component 110, a suppressor component 115, a transmit pathway 120, a receive pathway 125, and an echo cancellation pathway 130. Transmit pathway 120 may comprise a transmit pathway DAC 135 and a transmit pathway amplifier 140. Receive pathway 125 may comprise a receive pathway Analog-to-Digital Converter (ADC) 145 and a receive pathway amplifier 150. And echo cancellation pathway 130 may comprise an echo cancellation pathway DAC 155 and an echo cancellation pathway amplifier 160. Echo cancellation pathway 130 may be coupled to receive pathway 125 as shown in FIG. 1.

System 100 may comprise a node in an HFC network. The node may comprise a container that may house optical and electrical circuitry. An optical fiber cable may be connected to one side of the node and a plurality of coaxial cables may be connected to the other side of the node. The optical fiber cable may be connected to a cable modem termination system (CMTS) in a headend in the HFC network and the plurality of coaxial cables may be connected to CPE of subscribers to the HFC. As such, the node may facilitate communications between the headend and the CPE. Consistent with embodiments of the disclosure, system 100 may comprise an FDX amplifier supporting FDX Data Over Cable Service Interface Specification (DOCSIS) operation.

The CMTS may comprise a device located in a service provider's (e.g., a cable company's) headend that may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., RPHY nodes) in a network. Remote. Remote PHY 105 may comprise circuitry to implement the physical layer of the CMTS.

Echo cancellation component 110 may be practiced in an electrical circuit comprising discrete electronic elements, packaged or integrated electronic chips containing logic gates, a circuit utilizing a microprocessor, or on a single chip containing electronic elements or microprocessors. Furthermore, echo cancellation component 110 may also be practiced using other technologies capable of performing logical operations such as, for example, AND, OR, and NOT, including but not limited to, mechanical, optical, fluidic, and quantum technologies. As described in greater detail below with respect to FIG. 3, echo cancellation component 110 may be practiced in a computing device 300.

Suppressor component 115 may be practiced in an electrical circuit comprising discrete electronic elements, packaged or integrated electronic chips containing logic gates, a circuit utilizing a microprocessor, or on a single chip containing electronic elements or microprocessors. Furthermore, suppressor component 115 may also be practiced using other technologies capable of performing logical operations such as, for example, AND, OR, and NOT, including but not limited to, mechanical, optical, fluidic, and quantum technologies. As described in greater detail below with respect to FIG. 3, suppressor component 115 may be practiced in a computing device 300. Echo cancellation component 110 and suppressor component 115 may comprise different components as shown in FIG. 1 or the functionality of echo cancellation component 110 and suppressor component 115 may be combined into one component consistent with embodiments of the disclosure.

Regarding transmit pathway 120, remote PHY 105 may send a digital downstream signal to transmit pathway DAC 135 that my convert the digital downstream signal to an analog downstream signal. Transmit pathway DAC 135 may provide the analog downstream signal to transmit pathway amplifier 140. Transmit pathway amplifier 140 may provide the analog downstream signal on transmit pathway 120 to a coupler that may provide the analog downstream to customer premises equipment on the HFC network. The customer premises equipment may comprise, but are not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device.

Downstream signal echoes 165 may be present within system 100. For example, downstream signal echoes 165 may be present due to reflections of the analog downstream signal in the aforementioned coupler into receive pathway 125. Downstream signal echoes 165 may combine with an upstream signal 170 received at the coupler from customer premises equipment on the HFC. Embodiments of the disclosure may cancel downstream signal echoes 165 by coupling an echo canceling signal 175 into receive pathway 125. Consequently, upstream signal 170 may be received by receive path amplifier 150 and fed to receive path ADC 145 where upstream signal 170 may be converted to a digital signal.

The magnitudes and phases (delays) of downstream signal echoes 165 may be tracked in the base band by echo cancellation component 110. Echo cancellation component 110 may generate echo canceling signal 175 from the downstream signal. Echo canceling signal 175 may comprise the echoes tracked, with the same magnitudes, but 180 degree out of phases as illustrated by FIG. 1. Echo canceling signal 175 may be converted to an analog signal via echo cancellation pathway DAC 155 and added back to receiver pathway 125 to cancel out the tracked echoes (i.e., downstream signal echoes 165).

Because echo canceling signal 175 may be converted to analog by echo cancellation pathway DAC 155, noise from echo cancellation pathway DAC 155 may be included in echo canceling signal 175 and introduced into upstream signal 170 on receiver pathway 125. Depending on the echo cancellation pathway DAC 155 dynamic range, noise from echo cancellation pathway DAC 155 may be comparable to the receive pathway ADC 145 noise. Consequently, embodiments of the disclosure may add little or no gain to upstream signal 170 Signal-to-Noise Ratio (SNR). Noise from echo cancellation pathway DAC 155 may comprise, for example, quantization noise, flicker noise, thermal noise, and harmonics (i.e., non-linear distortion). However, the dominant noise in echo cancellation pathway DAC 155 may comprise the non-linear distortion (i.e., harmonics). Embodiments of the disclosure may reduce the signal level of the echo to preserve receiver dynamic range (ADC dynamic range).

As described in greater detail below with respect to FIG. 2, embodiments of the disclosure may: i) schedule silence periods for the downstream and the upstream of system 100; ii) send a training signal to characterize echo cancellation pathway DAC 155 non-linearity; and iii) suppressor component 115 may cancel out echo cancellation pathway DAC 155 non-linearity noise. The downstream and upstream silence periods may be specified in FDX DOCSIS 3.1 standard for example.

Figure 2:
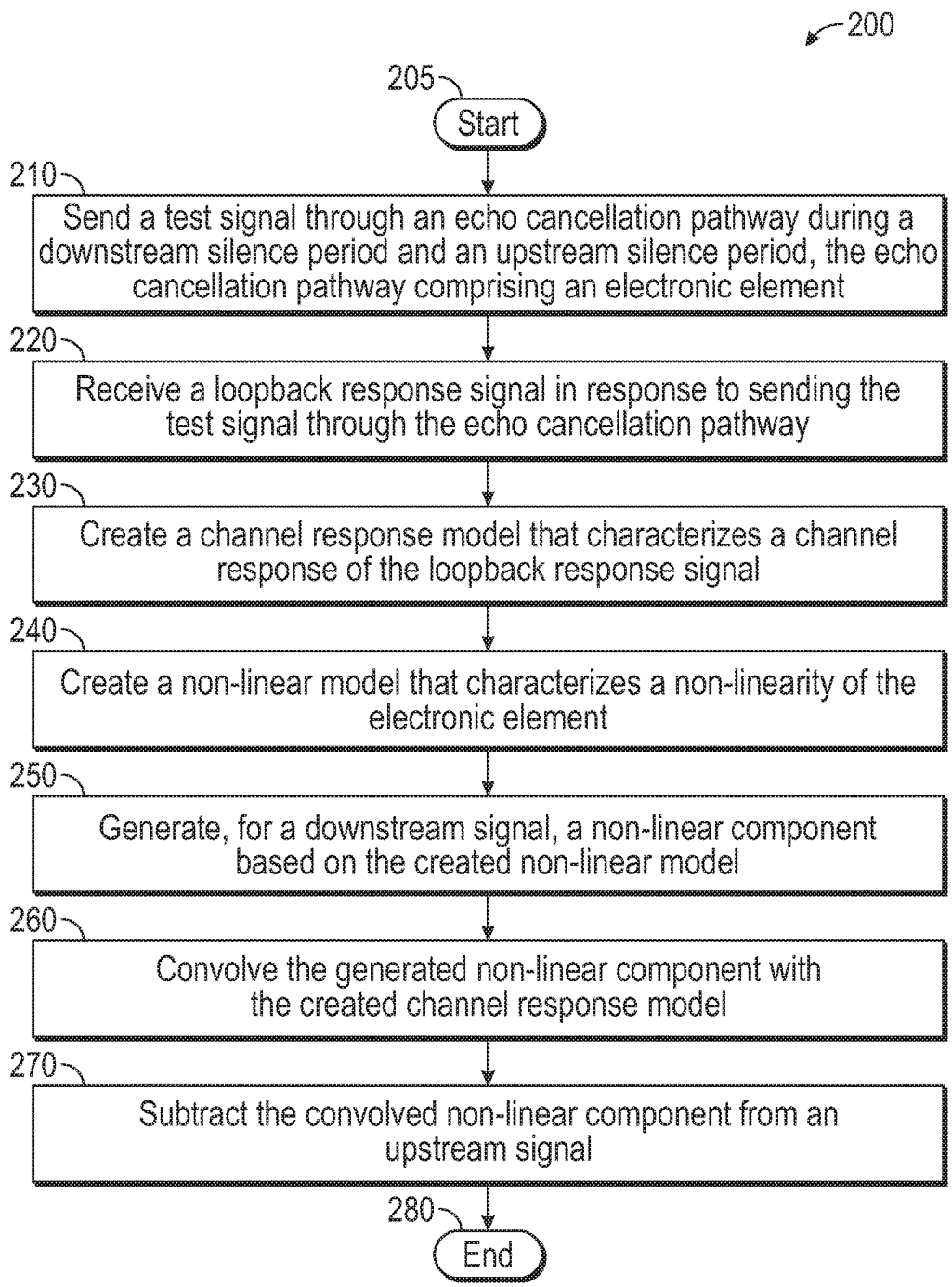
FIG. 2 is a flow chart of a method for providing noise suppression.

FIG. 2 is a flow chart setting forth the general stages involved in a method 200 consistent with an embodiment of the invention for providing noise suppression. Method 200 may be implemented using echo cancellation component 110 and suppression component 115 as described in more detail above with respect to FIG. 1. While method 200 describes the process being carried out by two components (i.e., echo cancellation component 110 and suppression component 115) the stages of FIG. 2 may be carried out by one component. Ways to implement the stages of method 200 will be described in greater detail below.

Method 200 may begin at starting block 205 and proceed to stage 210 where echo cancellation component 110 may send a test signal through echo cancellation pathway 130 during a downstream silence period and an upstream silence period. Echo cancellation pathway 130 comprising an electronic element. The electronic element, for example, may comprise echo cancellation pathway DAC 155. For example, during the downstream silence period and the upstream silence period, no downstream signals may be sent from remote PHY 105 and no upstream signals may be received from customer premises equipment on the HFC. The downstream and upstream silence periods may be specified in FDX DOCSIS 3.1 standard for example.

From stage 210, where echo cancellation component 110 sends the test signal through echo cancellation pathway 130, method 200 may advance to stage 220 where echo cancellation component 110 may receive a loopback response signal in response to sending the test signal through echo cancellation pathway 130. For example, echo cancellation pathway 130 may couple the test signal from echo cancellation component 110 onto receive pathway 125 where it may be fed back to echo cancellation component 110 as the loopback response signal.

Once echo cancellation component 110 receives the loopback response signal in stage 220, method 200 may continue to stage 230 where echo cancellation component 110 may create a channel response model that characterizes a channel response of the loopback response signal. For example, the channel response model may characterize the channel traversed by the test signal as it was looped back to echo cancellation component 110.

After echo cancellation component 110 creates the channel response model in stage 230, method 200 may proceed to stage 240 where echo cancellation component 110 may create a non-linear model that characterizes a non-linearity of the electronic element. For example, echo cancellation component 110 may create the non-linear model that characterizes the non-linearity of the electronic element by comparing the sent test signal with the received loopback response signal.

From stage 240, where echo cancellation component 110 creates the non-linear model, method 200 may advance to stage 250 where suppression component 115 may generate, for a downstream signal, a non-linear component based on the created non-linear model. For example, echo cancellation component 110 may provide suppression component 115 with the channel response model that characterizes the channel response of the loopback response signal and the created a non-linear model.

Once suppression component 115 generates the non-linear component in stage 250, method 200 may continue to stage 260 where suppression component 115 may convolve the generated non-linear component with the created channel response model.

After suppression component 115 convolves the generated non-linear component with the created channel response model in stage 260, method 200 may proceed to stage 270 where suppression component 115 may subtract the convolved non-linear component from upstream signal 175. For example, receive pathway ADC 145 may feed upstream signal 170 to suppression component 115. In this way, suppressor component 115 may cancel out echo cancellation pathway DAC 155 non-linearity noise from upstream signal 170 by subtracting the convolved non-linear component from upstream signal 175. Upstream signal 170 may then be fed to remote PHY 105. Once suppression component 115 subtracts the convolved non-linear component from upstream signal 175 in stage 270, method 200 may then end at stage 280.

Figure 3:
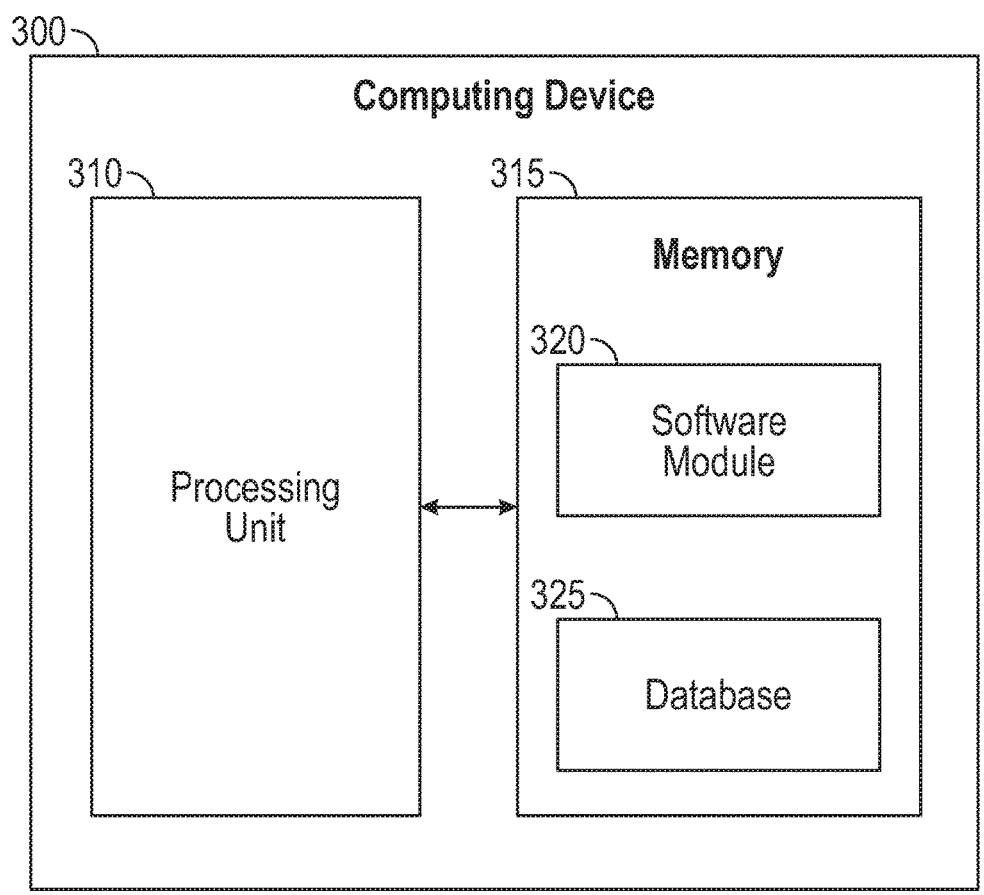
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing noise suppression, including for example, any one or more of the stages from method 200 described above with respect to FIG. 2. Computing device 300, for example, may provide an operating environment for echo cancellation component 110 and suppression component 115. Echo cancellation component 102 and suppression component 115 may operate in other environments and is not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
sending a test signal through an echo cancellation pathway during a downstream silence period and an upstream silence period, the echo cancellation pathway comprising an electronic element;
receiving a loopback response signal in response to sending the test signal through the echo cancellation pathway;
creating a channel response model that characterizes a channel response of the loopback response signal;
creating a non-linear model that characterizes a non-linearity of the electronic element;
generating, for a downstream signal, a non-linear component based on the created non-linear model;
convolving the generated non-linear component with the created channel response model; and
subtracting the convolved non-linear component from an upstream signal.

2. The method of claim 1, further comprising scheduling a DS silence period.

3. The method of claim 1, further comprising scheduling an US silence period.

4. The method of claim 1, further comprising generating the test signal.

5. The method of claim 1, wherein the electronic element comprises a Digital-to-Analog Converter (DAC).

6. The method of claim 1, wherein creating the non-linear model that characterizes the non-linearity of the electronic element comprises comparing the sent test signal with the received loopback response signal.

7. The method of claim 1, wherein sending the test signal through the echo cancellation pathway comprises sending the test signal through the echo cancellation pathway disposed in a node disposed in a Hybrid Fiber-Coaxial (HFC) network.

8. A system comprising:
a memory storage; and
a processing unit coupled to the memory storage, wherein the processing unit is operative to:
send a test signal through an echo cancellation pathway during a downstream silence period and an upstream silence period, the echo cancellation pathway comprising an electronic element;
receive a loopback response signal in response to sending the test signal through the echo cancellation pathway;
create a channel response model that characterizes a channel response of the loopback response signal;
create a non-linear model that characterizes a non-linearity of the electronic element;
generate, for a downstream signal, a non-linear component based on the created non-linear model;
convolve the generated non-linear component with the created channel response model; and
subtract the convolved non-linear component from an upstream signal.

9. The system of claim 8, wherein the processing unit is further operative to schedule a DS silence period.

10. The system of claim 8, wherein the processing unit is further operative to schedule an US silence period.

11. The method of claim 8, wherein the processing unit is further operative to generate the test signal.

12. The system of claim 8, wherein the electronic element comprises a Digital-to-Analog Converter (DAC).

13. The system of claim 8, wherein the processing unit being operative to create the non-linear model that characterizes the non-linearity of the electronic element comprises the processing unit being operative to compare the sent test signal with the received loopback response signal.

14. The system of claim 8, wherein the processing unit being operative to send the test signal through the echo cancellation pathway comprises the processing unit being operative to send the test signal through the echo cancellation pathway disposed in a node disposed in a Hybrid Fiber-Coaxial (HFC) network.

15. A non-transitory computer-readable medium that stores a set of instructions which when executed perform a method comprising:
sending a test signal through an echo cancellation pathway during a downstream silence period and an upstream silence period, the echo cancellation pathway comprising an electronic element;
receiving a loopback response signal in response to sending the test signal through the echo cancellation pathway;
creating a channel response model that characterizes a channel response of the loopback response signal;
creating a non-linear model that characterizes a non-linearity of the electronic element;
generating, for a downstream signal, a non-linear component based on the created non-linear model;
convolving the generated non-linear component with the created channel response model; and
subtracting the convolved non-linear component from an upstream signal.

16. The non-transitory computer-readable medium of claim 15, further comprising:
scheduling a DS silence period; and
scheduling an US silence period.

17. The non-transitory computer-readable medium of claim 15, further comprising generating the test signal.

\* \* \* \* \*